(12) United States Patent
Thomas et al.

(10) Patent No.: US 6,301,574 B1
(45) Date of Patent: Oct. 9, 2001

(54) SYSTEM FOR PROVIDING BUSINESS INFORMATION

(75) Inventors: Brian Christopher Thomas; Jason Daniel Osborne, both of Harrisonburg, VA (US)

(73) Assignee: Efirms.com, Inc., Harrisonburg, VA (US)

(*) Notice: Subject to any disclaimer, the term of this patent is extended or adjusted under 35 U.S.C. 154(b) by 0 days.

(21) Appl. No.: 09/186,927

(22) Filed: Nov. 6, 1998

(51) Int. Cl.⁷ ........................................ G06F 17/30
(52) U.S. Cl. ........................ 707/1; 707/10; 705/37; 705/26
(58) Field of Search ................ 707/1, 103, 104, 707/3, 6, 9, 10; 705/37, 1, 26, 27; 709/227; 700/92

(56) References Cited

U.S. PATENT DOCUMENTS

| | | |
|---|---|---|
| 4,852,001 | 7/1989 | Tsushima et al. ............. 705/8 |
| 5,117,353 | 5/1992 | Stipanovich et al. .......... 705/11 |
| 5,164,897 * | 11/1992 | Clark et al. .................. 705/1 |
| 5,243,515 * | 9/1993 | Lee ............................. 705/37 |
| 5,283,731 | 2/1994 | Lalonde et al. .............. 705/1 |
| 5,416,694 | 5/1995 | Parrish et al. ................ 705/8 |
| 5,459,859 | 10/1995 | Senda ......................... 707/10 |
| 5,592,375 | 1/1997 | Salmon et al. ............... 705/7 |
| 5,634,055 * | 5/1997 | Barnewall et al. ........... 707/103 |
| 5,671,409 | 9/1997 | Fatseas et al. ............... 707/104 |
| 5,734,828 | 3/1998 | Pendse et al. ............... 709/203 |
| 5,754,850 | 5/1998 | Janssen ....................... 707/104 |
| 5,758,324 | 5/1998 | Hartman et al. ............. 705/1 |
| 5,758,328 * | 5/1998 | Giovannoli .................. 705/26 |
| 5,778,181 | 7/1998 | Hidary et al. ............... 709/218 |
| 5,794,219 * | 8/1998 | Brown ........................ 705/37 |
| 5,799,285 | 8/1998 | Klingman .................... 705/26 |
| 5,799,304 | 8/1998 | Miller ......................... 707/7 |
| 5,832,497 * | 11/1998 | Taylor ........................ 707/104 |
| 6,073,176 * | 6/2000 | Baindur et al. .............. 709/227 |

* cited by examiner

*Primary Examiner*—Sanjiv Shah
(74) *Attorney, Agent, or Firm*—W. Jackson Matney, Jr.; Milbank, Tweed, Hadley & McCloy LLP

(57) ABSTRACT

An apparatus, method and data structure for communicating business information, including outsourcing information. Contractor provide information regarding their products and services into the system. Outsourcing companies search a database containing contractor information to determine which contractor meet a particular search criteria. Selected contractors receive project information and, optionally, a bid template. Bid information is supplied to the database operator. The operator prepares a table of bid information that is sent to the outsourcing companies for review. Evaluation information relating to contractors and outsourcing companies is obtained from both outsourcing companies and contractors and stored on a database. The evaluation information is provided to outsourcing companies and contractors as part of the bid and project information

20 Claims, 14 Drawing Sheets

| | |
|---|---|
| Contact Name | ~ 2110 ~ |
| Company Name | ~ 2120 ~ |
| Contact Title | ~ 2125 ~ |
| Address | ~ 2130 ~ |
| City | ~ 2131 ~ |
| State | ~ 2132 ~      Nation  ~ 2133 ~ |
| Postal Code | ~ 2134 ~ |
| E-mail | ~ 2140 ~ |
| Phone | ~ 2150 ~      Fax  ~ 2160 ~ |
| Occupational Classification | ~ 2170 ~ |

Products and/or Services

~ 2180 ~

| | |
|---|---|
| Territory | ~ 2190 ~ |

Company Description

~ 2200 ~

| | |
|---|---|
| Password | ~ 2210 ~ |

[Submit] 2220     [Save] 2230

| | |
|---|---|
| Contact Name | ~ 2310 ~ |
| Company Name | ~ 2320 ~ |
| Contact Title | ~ 2330 ~ |
| Address | ~ 2340 ~ |
| City | ~ 2341 ~    State ~ 2342 ~ |
| Nation | ~ 2343 ~ |
| Postal Code | ~ 2344 ~ |
| E-mail Address | ~ 2350 ~ |
| Phone | ~ 2360 ~    Fax ~ 2370 ~ |
| Outsourcing Title | ~ 2380 ~ |

Outsourcing Description

~ 2390 ~

Cost Estimate ~ 2400 ~          Time Estimate ~ 2410 ~

Search Criteria:

Outsourcing Occupational Classification

~ 2420 ~

Products and/or Services

~ 2430 ~

Results    ¤ Automatic    ¤ Manual
2440

Member Identification Number   ~ 2450 ~    Password ~ 2460 ~

Search now          Save
2470                2480                          2300

Figure 4

| Company | Location | Territory |
|---|---|---|
| ~ 2710 ~ | ~ 2711 ~ | ~ 2712 ~ |

| Occupational Classification | Products and/or Services | Company Description |
|---|---|---|
| ~2713 ~ | ~ 2714 ~ | ~ 2715 ~ |

| Company | Location | Territory |
|---|---|---|
| ~ 2720 ~ | ~ 2721 ~ | ~ 2722 ~ |

| Occupational Classification | Products and/or Services | Company Description |
|---|---|---|
| ~ 2723 ~ | ~ 2724 ~ | ~ 2725 ~ |

| Company | Location | Territory |
|---|---|---|
| ~ 2730 ~ | ~ 2731 ~ | ~ 2732 ~ |

| Occupational Classification | Products and/or Services | Company Description |
|---|---|---|
| ~ 2733 ~ | ~ 2734 ~ | ~ 2735 ~ |

| Company | Location | Territory |
|---|---|---|
| ~ 2740 ~ | ~ 2741 ~ | ~ 2742 ~ |

| Occupational Classification | Products and/or Services | Company Description |
|---|---|---|
| ~ 2743 ~ | ~ 2744 ~ | ~ 2745 ~ |

Outsourcing Request Information

| Field | |
|---|---|
| Outsourcing Company | ~ 2510 ~ |
| Location | ~ 2520 ~ |
| Outsourcing Title | ~ 2530 ~ |
| Outsourcing Description | ~ 2540 ~ |
| Cost Estimate | ~ 2550 ~ |
| Time Estimate | ~ 2560 ~ |
| Occupational Classification | ~ 2570 ~ |

| | |
|---|---|
| Select your company from list | ~ 2580 ~ |
| Your proposed cost estimate | ~ 2590 ~ |
| Your proposed time estimate | ~ 2600 ~ |

Additional comments to be sent to outsourcing company

~ 2610 ~

Submit
2620

| | |
|---|---|
| Select a bidding contractor | ~ 2910 ~ |

| | |
|---|---|
| Your cost estimate | ~ 2920 ~ |
| Bidding contractor cost estimate | ~ 2921 ~ |

| | |
|---|---|
| Your time estimate | ~ 2930 ~ |
| Bidding contractor time estimate | ~ 2931 ~ |

| | |
|---|---|
| Bidding contractor's comments | ~ 2940 ~ |

Bidding contractor's contact information

| | |
|---|---|
| Name | ~ 2950 ~ |
| E-Mail | ~ 2951 ~ |
| Phone | ~ 2952 ~ |
| Fax | ~ 2953 ~ |

| Contractor | Estimated Cost | Estimated Time | Comments | Name | e-mail | Phone | Fax |
|---|---|---|---|---|---|---|---|
| ~ 2910 ~ | ~ 2921 ~ | ~ 2931 ~ | ~ 2940 ~ | ~ 2950 ~ | ~ 2951 ~ | ~ 2952 ~ | ~ 2953 ~ |
| | | | | | | | |
| | | | | | | | |
| | | | | | | | |
| | | | | | | | |

3000

Contractor Company Name [ ~ 4100 ~                                    ]

Contact Name    [ ~ 4110 ~                                              ]
Company Name    [ ~ 4120 ~                                              ]
Contact Title   [ ~ 4130 ~                                              ]

Please rate the overall performance of this contractor (1 lowest to 5 highest)
○ [1]    ○ [2]    ⊙ [3]    ○ [4]    ○ [5]
                                          ↘
                                           4140

This task was completed _____ schedule ◄─── 4150
○ [far behind]    ○ [behind]    ⊙ [on]    ○ [ahead of]    ○ [far ahead of]

This project was _____ budget ◄─── 4160
○ [far over]    ○ [over]    ⊙ [on]    ○ [under]    ○ [far under]

Your company's managerial role was mostly
Passive <------------> Active                    ◄─── 4170
○ [1]    ○ [2]    ⊙ [3]    ○ [4]    ○ [5]

The term of the contract was    [              ]
                                              ◄─── 4180

Would you recommend this contractor?
○ [Yes]    ○ [No]
                  ↖
                   4190
Please make any additional comments here
[ ~ 4191 ~                                                              ]

[Submit]
       ↘
        4195

Contractor  | ~ 5070 ~ |

| Performance (Scale of 1-5) | Time Completed | Budget | Company Managerial Role (Scale of 1-5) | Recommend? |
|---|---|---|---|---|
| ~ 5010 ~ | ~ 5020 ~ | ~ 5030 ~ | ~5040~ | ~5050~ |
| Comments ~ 5060 ~ |||||

5000

Outsourcing Company Name [ ~ 6100 ~                                    ]

Contact Name      [ ~ 6110 ~                                           ]
Contractor Name   [ ~ 6120 ~                                           ]
Contact Title     [ ~ 6130 ~                                           ]

Would you recommend this outsourcing company?                    ← 6140
                    Yes ○      No ○

Did the outsourcing company pay on time?                         ← 6150
                ○  ○  ○  ○  ○
Never       1   2   3   4   5   Always
              Sometimes How clearly did the outsourcing company define goals/objectives?  ← 6160
                ○  ○  ○  ○  ○
Consistently Unclear  1   2   3   4   5   Clearly Defined What was the outsourcing company's availability and readiness to aid and assist?  ← 6170
           ○  ○  ○  ○  ○
Sloth-like   1   2   3   4   5   Very Eager
        Intermittent What was most important to the outsourcing company?              ← 6180
     Time ○   Budget ○   N/A ○

How open was the outsourcing company to suggestions?             ← 6190
            ○  ○  ○  ○  ○
Close Minded  1   2   3   4   5   Very Eager How would you rank the compatibility of the outsourcing company?  ← 6200
          ○  ○  ○  ○  ○
Low    1   2   3   4   5   High
        Average Please provide your comments
[ ~ 6210 ~                                                            ]

[ Submit ]                                                  ↖ 6000
  ↑
6220

Figure 10

Outsourcing Company　　　| ~ 7090 ~ |

| Recommend? | Paid on Time (Scale of 1-5) | Defined Goals (Scale of 1-5) | Availability and Readiness to Aid and Assist (Scale of 1-5) | Most important to Outsourcing Company | Openness to Suggestions (Scale of 1-5) | Compatibility (Scale of 1-5) |
|---|---|---|---|---|---|---|
| ~ 7010 ~ | ~ 7020 ~ | ~7030 ~ | ~ 7040 ~ | ~7050~ | ~ 7060 ~ | ~ 7070 ~ |
| Comments ~ 7080 ~ ||||||||

7000

Legal Name

Last [ ~ 9010 ~ ]  First [ ~ 9011 ~ ]  Middle [ ~ 9012 ~ ]

Address

Number and Street [ ~ 9020 ~ ]

City [ ~ 9021 ~ ]  State [ ~ 9022 ~ ]  Zip Code [ ~ 9023 ~ ]

Phone [ ~ 9030 ~ ]

E-Mail Address [ ~ 9040 ~ ]

Social Security Number [ ~ 9050 ~ ]

9000

SYSTEM FOR PROVIDING BUSINESS INFORMATION

BACKGROUND OF THE INVENTION

The invention relates in general to an apparatus, method and data structure for providing business information, including outsourcing information, to assist businesses in meeting their needs for providing and obtaining a variety of services. More particularly, the invention relates to an apparatus, method and data structure for facilitating communications between contractors and outsourcing companies that include marketing and search mechanisms, bid management, contractor and outsourcing company assessment, and other various features.

Recently, businesses have turned increasingly to outsourcing work that would be either cost-prohibitive to do in-house or outside of their primary business. Because most outsourcing companies currently use only a few, select contractors with whom they have close ties, significant inefficiencies exist that result in a glut of smaller firms not having access to these outsourcing companies. Further, outsourcing companies are denied competitive pricing due to a limited pool of contractors and occasionally have difficulty finding qualified applicants to perform highly skilled work.

Businesses can also use a middleman or broker to aide their procurement of services. A broker's success is highly dependent on access to market information regarding various goods or services. Although brokers can procure goods and services at reasonable rates and can save time for outsourcing companies, brokers are expensive and their expertise is typically limited to a particular industry or a limited number of industries. To the extent that buyers and sellers of goods and services have access to market information, they can procure goods and services at market; however, gaining such access is a time-intensive activity.

Buyers and sellers can also use umbrella firms to outsource various projects. Umbrella firms seek to establish a contractual relationship with outsourcing firms, who are generally searching for six-to thirty-six-month contracts. The umbrella firms profit by receiving contracts and distributing the contracts to the firms working under their umbrellas. Often, the umbrella firms provide some traditional business services such as bookkeeping, accounting, and billing to the other firms under the umbrella.

The deficiencies associated with past methods, including the use of brokers and umbrella firms, are that they are time intensive, utilize slow processes, draw from a limited pool of contractors, are expensive, and are inefficient.

The foregoing demonstrates that there is a need for an invention which greatly reduces the time required to identify and procure services, improves pricing due to substantial competition, and accomplishes these goals at competitive prices.

SUMMARY OF THE INVENTION

The invention satisfies the need and avoids the drawbacks of the prior art by providing an apparatus, method and data structure that set forth an interactive venue for firms of all sizes, both to showcase their talent and to identify contractors meeting their outsourcing requirements. Outsourcing companies may be provided with access to a network of independent contractors, both in order to find new business and to contract work out. Access to this network condenses the process of locating and hiring independent contractors from weeks or months into an afternoon. In addition to the time savings associated with the procurement of services, the invention provides cost benefits in that the existence of a substantial pool of available contractors eliminates the inflated billing rates that may result from a lack of competition. Due to the economies of scale for business information, the invention can accomplish the above goals at a competitive cost. The invention also offers an assortment of databases to enable firms to locate information and solutions to an abundance of business problems and opportunities.

According to one aspect of the invention, an apparatus for and a method of communicating outsourcing information between an outsourcing company and a plurality of contractors are set forth. The apparatus and method may include the structure for and steps of logging onto an on-line database by each of the plurality of contractors, inserting contractor information into a plurality of requisite fields in a form provided by the on-line database by each of the plurality of contractors, and storing the contractor information in the on-line database. A user—such as an outsourcing company—may conduct a search on the on-line database for outsourcing information using skill criteria and may select a subset of contractors to receive outsourcing information associated with the outsourcing opportunity. The system may then preferentially transmit the outsourcing information and a bid form to the subset of contractors, accept bid information from a further subset of contractors, place the bid information in a report, and send the outsourcing company the report or an address identifying the location of the report on the database to permit the outsourcing company to compare and contrast the bid information received from the contractors.

The outsourcing company may limit its search to a specific universe of contractors or may choose to simply identify all contractors meeting its search criteria. System users, including contractors and outsourcing companies, may provide an assessment of a project, contractor or outsourcing company by entering information into an evaluation form which may be accessed by future users. The apparatus and method may include assigning passwords to users to allow future use of the system and the option of entering a sales associate identification number so that sales commissions may be tracked.

In another aspect of the invention, a system for communicating outsourcing information between an outsourcing company and a contractor contains a computer-readable memory for storing data for access by an application program and includes a data structure stored in the computer-readable memory. The data structure may include information used by the application program and may contain a log-in field having log-in information associated with each of the plurality of contractors; a plurality of contractor information fields for inserting contractor information into a form by each of the plurality of contractors; and a plurality of specific skill criteria fields for searching the plurality of contractor information fields. Additionally, the data structure may include a plurality of first subset fields for identifying a first subset of the plurality of contractors to receive the outsourcing information; a plurality of outsourcing information fields for sending the outsourcing information and, optionally, a bid form to the first subset of the plurality of contractors; a plurality of bid fields for accepting bid information from a second subset of the plurality of contractors on the bid form; a bid information table field for placing the bid information; and an address field for identifying an address of the bid information table to permit the outsourcing company to compare and contrast the bid information received from the second subset of the contractors.

The data structure of the computer-readable memory may include a password assigning field for assigning a password to outsourcing companies and contractors; and a sales associate field for entering a sales associate number. The data structure of the computer-readable memory may also include a plurality of evaluation fields for providing evaluation forms to permit a plurality of users to comment on and evaluate the on-line database and the plurality of users, including outsourcing companies and contractors, wherein the completed evaluation forms may be routed to a controller of the on-line database for future access by users.

The plurality of first subset fields may be used for selecting a first subset of contractors in an automatic or manual mode. The automatic mode permits selection of a set number of contractors meeting the specific skill criteria of the outsourcing company. In the manual mode, the outsourcing company may limit its search to specifically identified contractors.

BRIEF DESCRIPTION OF THE DRAWINGS

FIG. 3 illustrates typical data entered by a contractor and transmitted to the database according to the principles of the invention.

FIG. 4 illustrates typical skill criteria entered by an outsourcing company and transmitted to the database according to the principles of the invention.

FIG. 5 illustrates a typical search results template that is transmitted to an outsourcing company according to the principles of the invention.

FIG. 6 illustrates a typical bid template transmitted to a selected contractor according to the principles of the invention.

FIGS. 7A and 7B illustrate bid information reports generated based upon contractor's submitted bid information according to the principles of the invention.

FIG. 8 illustrates a contractor evaluation template useful for providing contractor assessment by outsourcing companies according to the principles of the invention.

FIG. 10 illustrates an outsourcing company evaluation template for providing assessment of an outsourcing company by contractors according to the principles of the invention.

DETAILED DESCRIPTION

Figure 1:
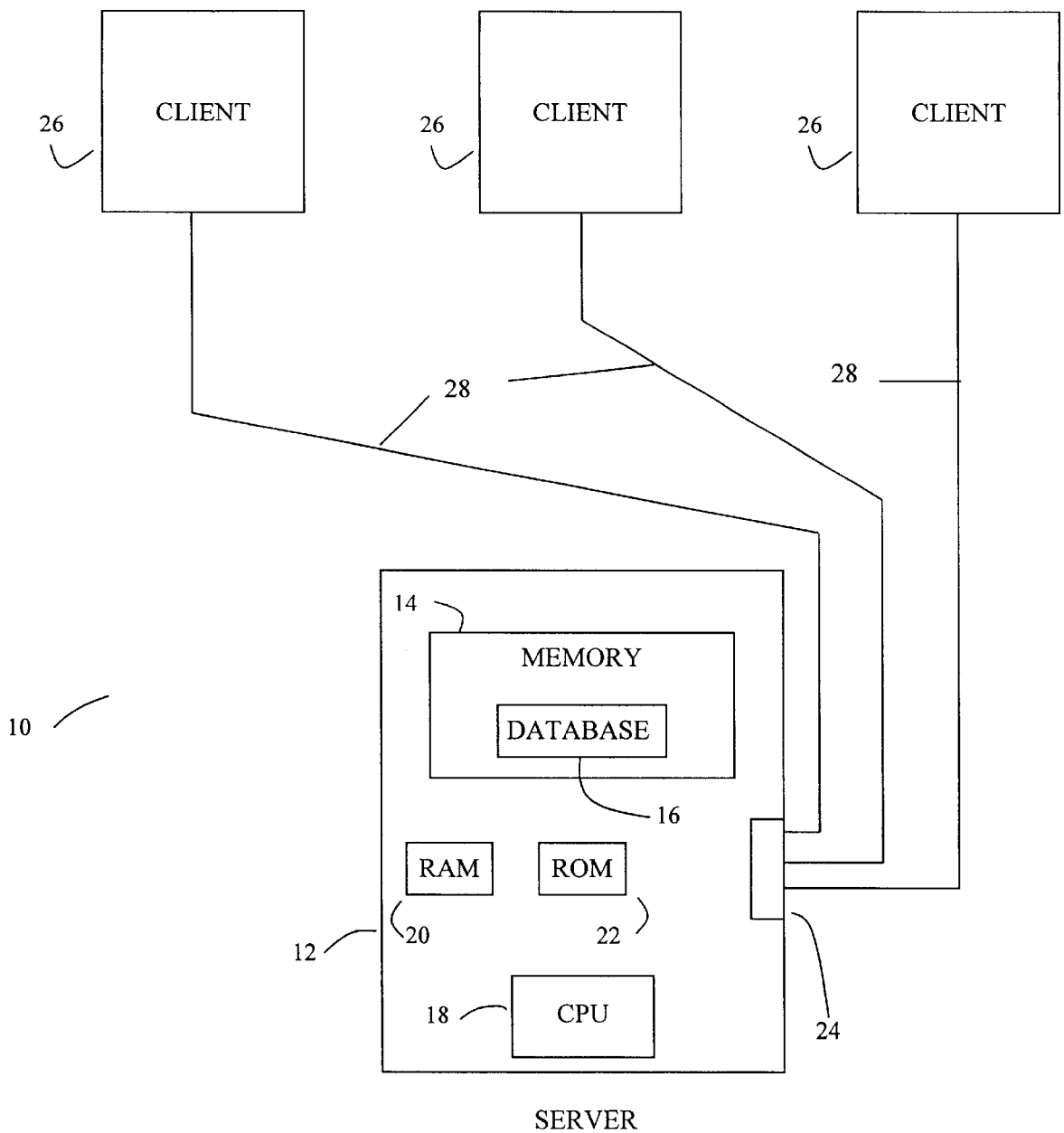
FIG. 1 illustrates a client-server network for a preferred embodiment of the invention.

FIG. 1 shows a system 10 for communicating outsourcing information according to one aspect of the invention. The system 10 depicted in FIG. 1 includes a server 12 having a memory 14, and a database 16 defined in the memory 14. The server 12 may be an ALPHA server, a minicomputer, a microcomputer, a UNIX machine, a mainframe computer, a personal computer with an Intel Pentium processor, a Macintosh personal computer, or any other suitable computer. The memory 14 is preferably non-volatile (e.g., CD-ROM, hard disk, tape drive, etc.). The server 12 has a central processing unit (CPU) 18, input devices such as a keyboard and mouse (not shown), output devices such as a monitor and printer (not shown), random access memory (RAM) 20, read-only memory (TOM) 22, serial and parallel ports (not shown), and communication hardware 24. The communication hardware 24 may connect the server 12 to the Internet In a preferred embodiment, the server 12 is a World Wide Web server connected to the Internet. Preferably, the server 12 has an operating system that is capable of multiple users and multi-tasking, such as UNIX, Windows NT, or LINUX. FIG. 1 also demonstrates the inclusion of one or more client machines 26 which communicate with the server 12. FIG. 1 does not disclose the specific interconnections between and among the various components in the server as this information is well known.

The client machines 26 may be connected to the server 12 by communication links 28. The communication links 28 between the server 12 and the client machines 26 may include a large variety of connections, including a telephone link, a hard-wired connection, a satellite link or other wireless connection, an Internet connection, a local area network (LAN), a wide area network (WAN), any combination of the preceding, or any other suitable type of connection. Multiple client machines 26 may communicate simultaneously with the server 12, and each connection may be by a different type of link (e.g., one connection may be by telephone while another may be by the Internet). As discussed above, the server 12 connects to communication links 28 via communication hardware 24.

After a link is established between the server 12 and a client machine 26, communication may take place via a variety of communication protocols, including file transfer protocol (FTP), electronic mail (e-mail), transfer control protocol/Internet protocol (TCP/IP), ASCII, X-MODEM, Y-MODEM, KERMIT, any combination of the preceding protocols, or any other suitable type of protocol.

In a preferred embodiment, the server 12 is an ALPHA server. With this platform, CPUs, memory, networking capabilities, storage, and software may be modified as appropriate to meet specific requirements. One preferred platform is an ALPHA 2000 4/275, which features 128 MB of memory, a CD-ROM drive, a 4.3 GB redundant array of independent disks (RAID), an 8 GB tape backup, and a 100 base-T network interface. The selection of a suitable server requires consideration of CPU speed as well as disk subsystem performance and network bandwidth. For example, a disk with a 7200 RPM rotational speed may be a suitable disk subsystem. Once the RAID is selected (RAID 0, 1, 2, 3, 4, or 5), the size of the database and its projected growth must be analyzed as part of the known design considerations.

The database on the server 12 may be of any suitable type. One type of server commonly used for large database applications is Oracle. Oracle is an extremely powerful and flexible relational database system. Procedural Language/Standard Query Language (PL/SQL) is a sophisticated programming language used to access the Oracle database from various environments. The Oracle database combines the power and flexibility of SQL (a fourth generation language (4GL)) with the procedural constructs of a third generation language (3GL). PL/SQL is integrated with the database server, so that the PLISQL code may be processed quickly and efficiently. Another important tool that PL/SQL provides is designed for data manipulation both internally (i.e., within Oracle) and externally in applications.

PL/SQL extends regular SQL by adding constructs found in other procedural languages. Another advantage of PL/SQL is that several SQL statements may be bundled together into one PL/SQL block and sent to the server as a single unit. This results in considerably lowered network traffic and a much faster application.

Another preferred database that may be employed is Oracle8i. The Oracle8i database is useful for Internet applications and manages the content, data and files typically managed by an operating system. Oracle8i has a Java Virtual Machine, a native Java compiler and a feature called Internet File System (iFS), which provides the ability to store, query and manage a wide range of relational and non-relational data within the database. iFS, written in Java, allows users to store 164 data types, including spreadsheets, word processing documents, Web pages and e-mail, within the database and retrieve them either in native file format or in HyperText Markup Language (HTML) through a browser. iFS indexes each file automatically and gives users enhanced security, database search capabilities, backup and recovery.

Other features in Oracle8i include WebDB, a environment run through a browser that enables developers to dynamically generate Web content and pages; SQLJ, a programming syntax that embeds SQL database statements into client or server Java code; and interMedia, a system for managing rich data types used over the Web. Of course, other database systems may be utilized according to the invention.

Figure 2A:
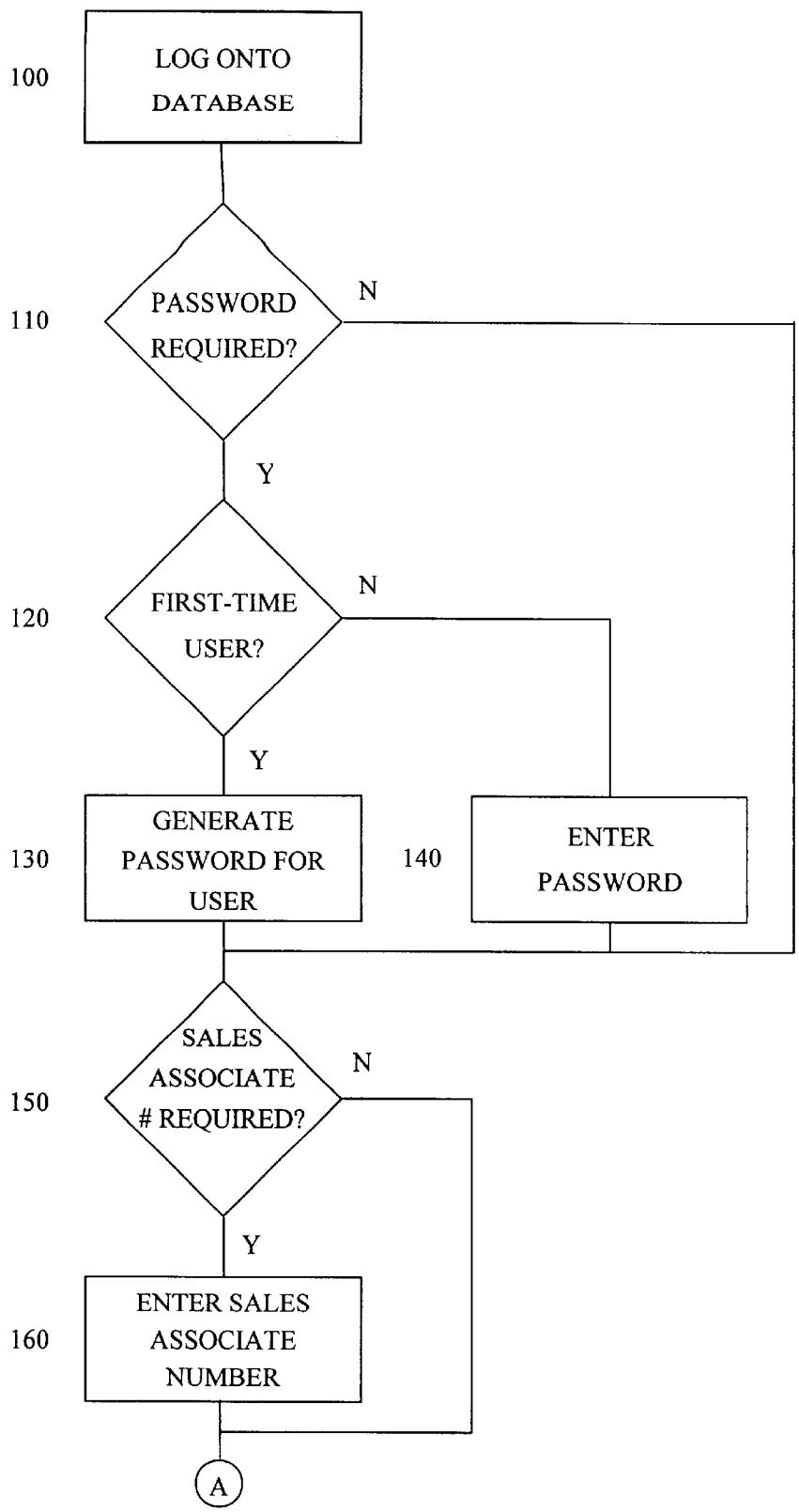
FIGS. 2A and 2B illustrate a flow of data entry and transmission for a preferred embodiment of the invention.
Figure 2B:
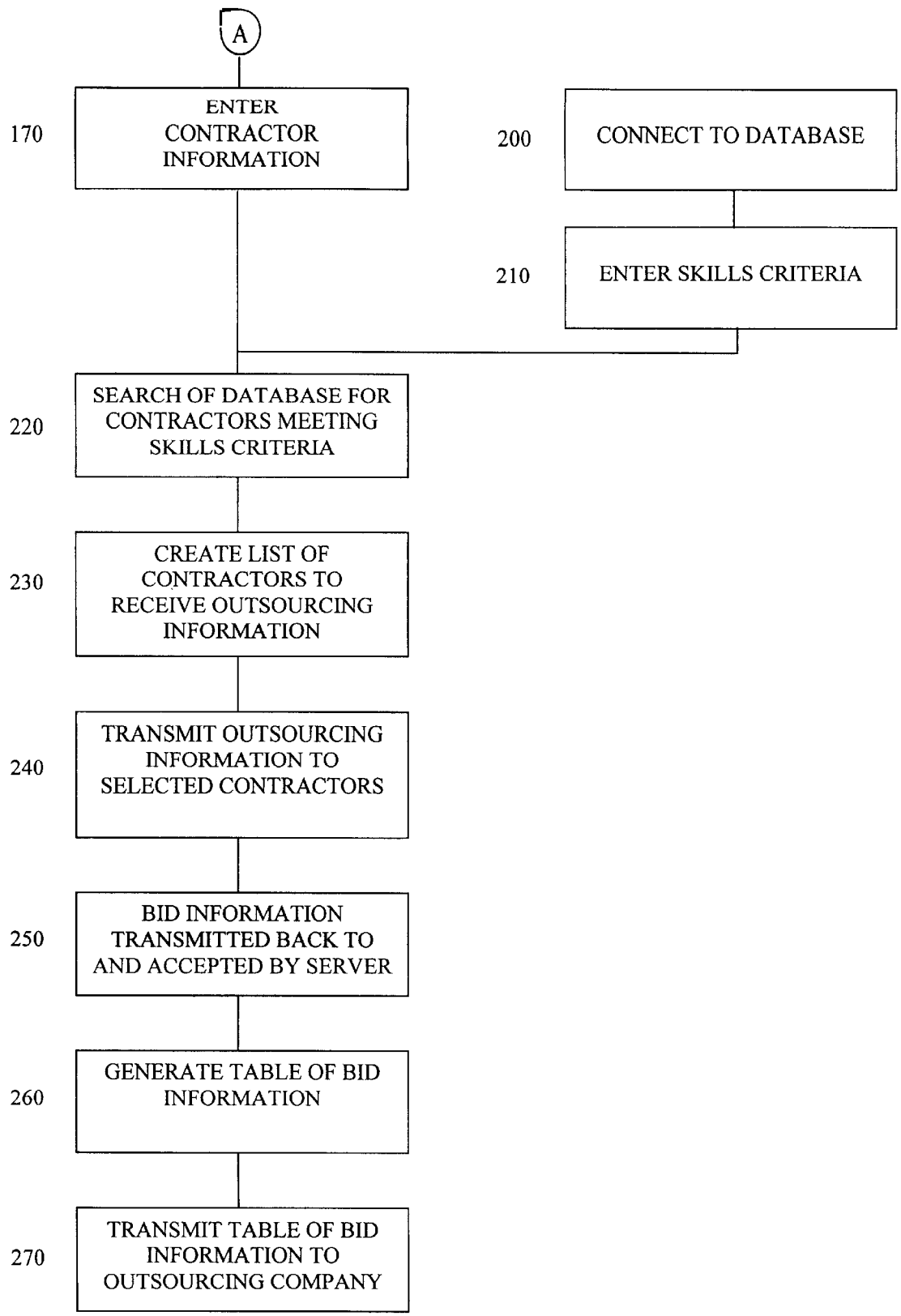

In a preferred embodiment, as seen in FIGS. 1, 2A, and 2B, a contractor uses a client machine 26 to connect to the server 12 via a communication link 28. The contractor may then log onto the database 16, as seen at step 100. Optionally, a password may be required of the contractor, as seen at step 110. If a password is required and the contractor has not used the system previously, as seen at step 120, the contractor is given a password by the server 12, as seen at step 130; otherwise the contractor must enter a password, as seen at step 140. Another optional feature is that the contractor may enter a sales associate identification number corresponding to an agent who procured the contractor's use of the system, as seen at steps 150 and 160. FIG. 2A does not illustrate additional steps for repeating the requests for a password and a sales associate number if the contractor enters incorrect data, as these additional steps are known. A contractor who has used the system previously has the option of editing or deleting the contractor's record (not shown).

After logging onto the server 12, a contractor may enter pertinent information into the database 16 concerning the contractor, including the contractor's field of business, length of time in business, number of employees, dates and times of availability, etc., as seen at step 170. An example of the various data entered by the contractor at step 170 is shown in FIG. 3. A wide variety of data may be entered at step 170 and is not limited to the types listed above. For example, other information may include placing the fee for routine services in the contractor's business description, pricing for limited periods of time, special offers, and the like.

An outsourcing company may connect to the server 12 from a client machine 26 via a communication link 28, as is seen at step 200. Optionally, the outsourcing company may also be required to enter a password or other identifying information, including a sales associate identification number, as discussed above (not shown). Once connected, the outsourcing company may enter specific skill criteria indicating the qualifications required of a contractor into the database 16. This is seen at step 210. An example of skill criteria that may be entered by the outsourcing company is demonstrated in FIG. 4. Steps 200 and 210 are independent from steps 100–170. Therefore, steps 200 and 210 may be performed by one or more outsourcing companies before, during or after any of steps 100–170 are performed by one or more contractors.

Once the contractor information is entered into the database 16 by one or more contractors, a search may be performed using server 12 to identify contractors meeting the skill criteria specified by the outsourcing company at step 210. This search is seen at step 220. For example, the outsourcing company may be seeking contractors who (1) perform carpentry work, (2) have more than 25 employees, (3) are available during January 1999, and (4) have more than ten years' experience. Other examples include looking for a programmer to provide a payroll program in C++ in two weeks, a designer to provide a graphic design of a logo in a month, and the like. It is understood that this search may take place on the server 12 whether or not any contractors or outsourcing companies are currently logged into the server 12. Once the search of the database 16 is performed for the specific skill criteria, a list of contractors may be identified who will receive the outsourcing information requested by the outsourcing company, as is seen at step 230. One form of a typical listing of contractors identified in a search is illustrated in FIG. 5.

The server 12 may then transmit the outsourcing information to the selected contractors along with a bid template, as is seen at step 240. The bid template may be a form which contains data fields that must be filled in by a contractor if that contractor is interested in bidding on a job, as is seen in FIG. 6. The transmission of outsourcing information to the selected contractors is preferably done via e-mail but may be accomplished using another type of communication protocol.

Figure 7B:
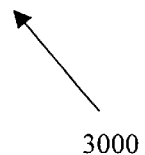

Once those in the group of selected contractors that choose to submit a bid have done so, the bid information may be transmitted back to the server 12, and accepted by the server 12, as is seen at step 250. The accepted bids are processed and may then be placed in a table of bid information, as is seen at step 260. An example of the contents of the table of bid information is shown in FIGS. 7A and 7B.

The table of bid information or, alternatively, an address of the location of such a table is then sent to the outsourcing company via a communication protocol such as e-mail. This is seen at step 270. From this table, the outsourcing company may then select a contractor with whom it wishes to do business. Even if the outsourcing company is unable to immediately select a contractor, the outsourcing company has substantially reduced the pool of possibilities to a select number of "choice" contractors.

As discussed above, contractors may place outsourcing information regarding services into the system. An example of a usefull contractor template 2100 that may be employed according to the principles of the invention is depicted in FIG. 3. Contractor template 2100 supplies a contact name field 2110; company name field 2120; contact title field 2125; address fields 2130, 2131, 2132, 2133, 2134; e-mail address field 2140; phone field 2150; and fax field 2160. Occupational classification field 2170 preferably contains a menu of occupations, such as Accountants and Auditors, Advertising and Promotions Managers, Aerospace Engineers, and the like. Products and/or services field 2180 permits the contractor to submit key words and phrases describing offered services. Territory field 2190 provides menu choices, such as local, statewide, nationwide, and global, to allow the contractor to communicate the size of the market serviced. Company description 2200 contains information similar to that of products and/or services field 2180, but allows for prose. Password field 2210 allows the contractor to enter a password that may be used to reenter the system at a later time without the necessity of again providing company information, such as company address, phone number, and the like. Selection of the submit button 2220 permits the contractor information to be placed on the system. Save button 2230 allows the contractor to save entered information without submitting the information to the system. This permits the contractor to save a partially completed template 2100, re-enter the system at some time in the future, complete the contractor information and submit the contractor information to the system without having to resubmit any information previously entered.

As described above, when a company seeks to outsource work, it may log onto the system 10 to search for contractors. An example of an outsourcing search template 2300 is depicted in FIG. 4. In this embodiment, the outsourcing company may enter corporate information in contact name field 2310; company name field 2320; contact title field 2330; address fields 2340, 2341, 2342,2343,2344; e-mail address field 2350; phone field 2360; and fax field 2370. With respect to the outsourced work or project, the outsourcing company may enter general information in outsourcing title field 2380, outsourcing description field 2390, cost estimate field 2400, and time estimate field 2410. Outsourcing occupational classification field 2420 tracks occupational classification field 2170 and preferably contains a similar menu, such as Accountants and Auditors, Advertising and Promotions Managers, Aerospace Engineers, and the like. A products and/or services field 2430 may be provided for the entry of key words and phrases describing required services. Results field 2440 includes two choices: automatic and manual. In the automatic mode, the outsourcing company selects the maximum number of contractors it would like to consider. In contrast, the manual mode permits the outsourcing company to select the specific contractors it wishes to consider. Search template 2300 employs a member identification number field 2450 and a password field 2460 which allows subsequent access to the outsourcing search request. Search now button 2470 initiates an immediate search, and save button 2480 permits partially created search criteria to be saved for a future search.

FIG. 5 demonstrates one manner of communicating the search results according to the invention through the employment of search results template 2700. Search results template 2700 includes company fields 2710, 2720, 2730, 2740; location fields 2711, 2721, 2731, 2741; territory fields 2712, 2722, 2732, 2742; occupational classification fields 2713, 2723, 2733, 2743; products and/or services fields 2714, 2724, 2734, 2744; and company description fields 2715, 2725, 2735, 2745, which correspond to fields 2120, 2130–34, 2190, 2170, 2180 and 2200, respectively, as discussed above. FIG. 5 is illustrative of a search that produced four contractors. It is understood that a greater or fewer number of contractors may be found based on the search criteria of the outsourcing company.

FIG. 6 illustrates a preferred bid template 2500 according to the principles of the invention. Bid template 2500 may be utilized to provide the outsourcing information submitted by an outsourcing company to each contractor meeting the search criteria of the outsourcing company. Bid template 2500 includes an outsourcing company field 2510; location field 2520; outsourcing title field 2530; outsourcing description field 2540; cost estimate field 2550; time estimate field 2560; and occupational classification field 2570. These fields contain information as received from an outsourcing company and correspond to fields 2320, 2340–44, 2380, 2390, 2400,2410 and 2420, respectively, as discussed above. The contractor may enter information responsive to the outsourcing request in contractor company field 2580, contractor cost estimate field 2590, contractor time estimate field 2600, and contractor comments field 2610. Contractor company field 2580 may be a menu of contractors selected by the outsourcing company. Submit button 2620 may be provided to permit a contractor's bid information to be conveyed to the system 10.

FIG. 7A depicts a bid information report 2900, which provides a suitable form to convey bid information from contractors to an outsourcing company. The outsourcing company may select a contractor from the bidding company field 2910, which may include a menu of bidding contractors. Based on this selection, cost estimate fields 2920, 2921, time estimate fields 2930, 2931, bidding contractor's comments field 2940, bidding contractor's name field 2950, e-mail field 2951, phone field 2952, and fax field 2953 are displayed to correspond with the selected contractor. Using bid information report 2900, an outsourcing company may quickly obtain a bidding contractor's cost, time, comments and contact information. Another manner of reporting bid information is demonstrated in FIG. 7B. As illustrated, bid information table 3000 simultaneously presents bid information from a plurality of contractors. Alternatively, the system 10 could send the outsourcing company an address to view bid information report 2900, bid information table 3000, or the like. The address could be, for example, a uniform resource locator (URL).

FIG. 8 provides a contractor evaluation template 4000 according to the principles of the invention. After the outsourced work is completed, an outsourcing company may enter evaluation information into the contractor evaluation template 4000 so that the contractor performance may be reviewed by other users. It is understood that an evaluation may include any number of considerations and that the following are merely illustrative. For example, the contractor evaluation template 4000 depicted in FIG. 8 includes a contractor name field 4100, outsourcing company contact name 4110, outsourcing company name field 4120, and outsourcing company contact title 4130. In this example, contractor evaluation template 4000 permits the outsourcing company to assess contractor performance, including overall performance field 4140, timing field 4150, budget field 4160, managerial role field 4170, contract term field 4180, recommendation field 4190 and comments field 4191. After entering information in the above fields, the outsourcing company may select the submit button 4195 to transfer its assessment of a contractor's work on a particular project to the system 10.

Figure 9:
FIG. 9 illustrates an evaluation report for contractors according to the principles of the invention.

A user may enter the system 10 to gather information regarding a particular contractor. For example, an outsourcing company may want an assessment of a contractor before accepting a bid from that contractor on a given project. FIG. 9 presents one suitable report form 5000 which includes a performance field 5010, timing field 5020, budget field 5030, managerial role field 5040, recommendation field 5050 and comments field 5060 for a selected contractor entered into contractor field 5070. These fields correspond to the fields illustrated in FIG. 8. Of course, report form 5000 may include a statistical analysis of the reported fields of a particular company and a comparison to all contractors, contractors within a particular class, contractors evaluated by a particular outsourcing company, and the like that may facilitate understanding of the reported information.

Likewise a contractor may enter evaluation information regarding an outsourcing company to allow review by other users. One suitable outsourcing evaluation template 6000 is demonstrated in FIG. 10 according to the principles of the invention. After the outsourced work is completed, a contractor may enter evaluation information into the outsourcing company evaluation template 6000 so that the outsourcing company performance may be reviewed by other users. It is understood that outsourcing company evaluation template 6000 is merely illustrative and that a variety of other considerations may be useful according to the principles of the invention. The outsourcing company evaluation template 6000 depicted in FIG. 10 includes outsourcing company name field 6100, contractor contact name field 6110, contractor name field 6120, and contractor contact title field 6130. In this example, outsourcing company evaluation template 6000 permits a contractor to assess outsourcing company performance, including recommendation field 6140, timely payment field 6150, defined goals/objectives field 6160, availability and readiness to aid and assist field 6170, importance field 6180, openness to suggestions field 6190, compatibility field 6200 and comments field 6210. After entering information in the above fields, the contractor may select the submit button 6220 to transfer its assessment of an outsourcing company on a particular project to the system 10.

Figure 11:
FIG. 11 illustrates an evaluation report for outsourcing companies according to the principles of the invention.
Figure 12:
FIG. 12 illustrates a sales associate template for entering pertinent sales associate information according to the principles of the invention.

A user may enter the system 10 to obtain information regarding a particular outsourcing company. A contractor may review assessments of an outsourcing company before deciding whether to bid on a particular project or may use the assessment information as factor in estimating the time or pricing of a bid. FIG. 11 presents one suitable report form 7000 for an outsourcing company that includes a recommendation field 7010, timely payment field 7020, defined goals/objectives field 7030, availability and readiness to aid and assist field 7040, importance field 7050, openness to suggestions field 7060, compatibility field 7070 and comments field 7080 for a selected outsourcing company entered into outsourcing company field 7090. These fields correspond to the fields illustrated in FIG. 10. As described above, report form 7000 may include a statistical analysis of the reported fields of a particular company and a comparison to all outsourcing companies, those within a particular class, those as evaluated by a particular user, and the like that may facilitate understanding of the reported information. Sales associates earn commissions and awards based on their level of developed business. As such, when users employ the system 10, as a result of communication with a particular sales associate, users may be requested to enter a sales associate identification number. These numbers are typically provided by the system 10. In a preferred embodiment, a sales associate completes a sales associate template 9000, which is illustrated in FIG. 12, and receives an identification number thereafter. Sales associate template 9000 provides name fields 9010, 9011, 9012; address fields 9020, 9021, 9022, 9023; phone field 9030; e-mail address field 9040; and, for tax purposes, Social Security number field 9050.

Regarding the depicted templates, forms and reports of the invention, it is understood that a fewer or greater number of fields may be employed by adding or subtracting choices or by consolidating or expanding choices as desired. Additionally, it is further understood that certain of the fields may substitute menu selections or a lookup table for text entry fields or vice versa, according to the design criteria of the application. Save and reset buttons may be used in combination with one or more of the templates, forms, and reports. A sales associate number field may also be provided in contractor template 2100, search template 2300 or any other template to facilitate the award of commissions and incentives to the appropriate sales associate, representative or agent. A field may be provided to allow files to be entered into a template, such as a building plan or schematic diagram, to facilitate understanding of a project or a user. A feedback submission field may be preferably provided so that users may convey assessment information of the system 10 to the controller of the system 10 so that the system 10 may be continually improved.

The invention may be advantageously combined with a number of databases, such as a resume database, an on-line stock statistics database, an interactive bulletin board database, and an on-line newspaper database. An example of a resume database system is disclosed in U.S. Pat. No. 5,758,324, to Hartman et al., the disclosure of which is incorporated by reference in its entirety, which may enable firms to determine solutions to their long-term labor needs. A stock statistics database would allow a user to run a regression of various stocks to evaluate the cyclical nature of a given stock and compare the results with, for example, the Dow Jones Average or the New York Stock Exchange Total Market Index. An electronic bulletin board database may be used to create a national business forum, focusing on Internet commerce, to provide a platform for the growth of corporations that need access to networks and venture capital. An on-line newspaper database may be used in conjunction with a searching device to conduct searches of on-line news archives and newspapers of the world and to e-mail the link (e.g., the URL) identified by the searching device to a results template that categorizes the location of identified articles of interest for each user into such headings as financial, world news, sports, etc. The combination of these databases with the invention provides a diversity of services that allows a one-stop-shopping venue for businesses. The invention also allows users to specialize their research within one domain, thus allowing them the ability to perform more efficient searches from a larger pool of information. Thus, the invention provides a node for those wishing to offer services to the global marketplace, and those seeking work, employees, venture capital, important news, and extensive business information.

Another database useful in combination with the invention is an on-line business journal database. The business journal database, in combination with system 10, may preferably commission and publish articles on topics receiving the greatest interest on the bulletin board through the utilization of a screening mechanism. For example, the screening mechanism may alphabetize all words entered into the bulletin board along with the number of times each word appears. A list of words organized from the greatest use to least use may then be prepared in a report form after eliminating words such as "a," "the," "that," and the like. The most commonly used words, which correspond to current topics, may form the basis of research and publication by the system 10. Additionally, the system 10 may publish graduate work relating to economics and business.

The invention may also be useful for facilitating firms seeking venture capital funds and those seeking to invest in such films. Firms seeking venture capital funding may enter their business plans or key information into a database which may then be searched by investors who select firms, send information to those firms through the database, and receive responses using modified forms, templates and reports of the invention. Conversely, investors may enter investment criteria onto a database, and firms seeking capital may search the database to identify appropriate investors. The transmission of templates between the firms and investors may then be accomplished according to the principles of the invention. In a similar fashion, firms seeking to identify joint venture partners, or merger and acquisition targets, may enter company information so that others may search this information to identify potential partners and acquisition targets. Of course, the system 10 would necessarily need to comply with state and federal laws and regulations, and it is likely that confidentiality agreements and the like would be supplied.

In another aspect, insurance companies may enter general information regarding health care, disability, automobile, home, and the like, into a database that may be searched by individuals and companies. Individual and company information may be transmitted to selected insurers that respond via the database using modified templates that are particular to the insurance industry according to the invention.

In still another aspect, companies may enter job openings that may be searched by potential employees who may send skill information and/or resumes to the companies using the templates and processing of the invention modified to the area of job transfers. The invention may also be useful to match shipping companies with those having shipping needs and those wishing to identify firms and forward and spot rates for the exchange of foreign currency.

What is claimed is:

1. A method of communicating outsourcing information between an outsourcing company and a plurality of contractors comprising:

storing contractor information and outsourcing company information into a database using an information template;

searching the database by using a search template to identify a first subset of contractors meeting specific criteria defined by the outsourcing company;

transmitting outsourcing information to the first subset of contractors from the database;

accepting bid information at the database from a second subset of contractors using a bid template, the second subset of contractors being a part of said first subset of contractors;

processing at the database bid information received from said second subset of contractors to prepare a bid information report;

transmitting the bid information report to the outsourcing company from the database;

storing for access by users at the database a contractor evaluation provided by the outsourcing company using a first evaluation template, wherein the first evaluation template includes contractor performance, timing, budget, contract term, recommendation, comments and overall performance fields; and storing for access by users at the database an outsourcing company evaluation provided by the contractor using a second evaluation template, wherein the second evaluation template includes performance, recommendation, timely payment, availability to aid and assist, importance of project, suggestions handling, compatibility, comments and overall performance fields.

2. The method of claim 1 wherein transmitting outsourcing information to the first subset of contractors further comprises transmitting a bid template.

3. The method of claim 1 wherein transmitting a bid information report to the outsourcing company further comprises transmitting a bid information table.

4. The method of claim 1 wherein transmitting a bid information report to the outsourcing company further comprises transmitting an address location on the database.

5. The method of claim 1 further comprising storing evaluations of users on the database.

6. The method of claim 1 wherein transmitting out sourcing information to the first subset of contractors further comprises transmitting evaluations of outsourcing companies.

7. The method of claim 1 wherein transmitting a bid information report to the outsourcing company further comprises transmitting evaluations of contractors.

8. An apparatus for communicating outsourcing information between an outsourcing company and a plurality of contractors comprising:

a server computer having a storage area;

a plurality of contractor computers, each of said plurality of contractor computers communicating contractor information to said storage area of said server computer using an information template;

an outsourcing computer, said outsourcing computer communicating outsourcing company information and specific criteria using a search template to said server computer;

wherein said server computer identifies and transmits outsourcing information to a first subset of said plurality of contractor computers, accepts bid information from a second subset of said plurality of contractor computers using a bid template, the second subset of contractor computers being a part of said first subset of contractor computers, processes bid information received from said second subset of contractor computers to prepare a bid information report, and transmits the bid information report to said outsourcing computer, stores for access by users a contractor evaluation provided by the outsourcing computer using a first evaluation template, wherein the first evaluation template includes contractor performance, timing, budget, contract term, recommendation, comments and overall performance fields, and stores for access by users at the server computer an outsourcing company evaluation provided by the contractor computer using a second evaluation template, wherein the second evaluation template includes performance, recommendation, timely payment, availability to aid and assist, importance of project, suggestions handling, compatibility comments and overall performance fields.

9. The apparatus of claim 8 wherein said server computer transmits performance evaluations to said contractor computers.

10. The apparatus of claim 8 wherein said server computer transmits performance evaluations to said outsourcing computer.

11. The apparatus of claim 8 wherein said server computer transmits a bid template to said first subset of said plurality of contractor computers.

12. The apparatus of claim 8 wherein said server computer transmits a location in said storage area containing said bid information report to said outsourcing computer.

13. An apparatus for communicating outsourcing information between an outsourcing company and a plurality of contractors comprising:

a database;

means for entering contractor information and outsourcing companies information into said database using an information template;

means for searching said database by using a search template to identify a first subset of said plurality of contractors meeting specific criteria defined by the outsourcing company;

means for transmitting outsourcing information to said first subset of said plurality of contractors from said database;

means for accepting bid information at said database from a second subset of said plurality of contractors using a bid template, the second subset of contractors being a part of said first subset of contractors;

means for processing at the database bid information received from said second subset of contractors to prepare a bid information report;

means for sending the bid information report to said outsourcing company from said database;

means for storing for access by users at the database a contractor evaluation provided by the outsourcing company using a first evaluation template, wherein the first evaluation template includes contractor performance, timing, budget, contract term, recommendation, comments and overall performance fields; and means for storing for access by users at the database an outsourcing company evaluation provided by the contractor using a second evaluation template, wherein the second evaluation template includes performance, recommendation, timely payment, availability to aid and assist, importance of project, suggestions handling, compatibility, comments and overall performance fields.

14. The apparatus of claim 13 further comprising means for transmitting performance evaluations from said database.

15. The apparatus of claim 13 further comprising means for transmitting a storage location on said database containing said bid information report to said outsourcing computer.

16. In a system for communicating outsourcing information between an outsourcing company and a plurality of contractors, a computer-readable memory for storing data for access by an application program comprising:

a data structure stored in said computer-readable memory, said data structure including information used by said application program and including:

a plurality of contractor information fields;

a plurality of outsourcing company information fields;

a plurality of criteria fields defined by the outsourcing company used to search said plurality of contractor information fields;

a plurality of first subset fields for identifying a first subset of said plurality of contractors;

a plurality of outsourcing information fields for sending said outsourcing information to said first subset of said plurality of contractors;

a plurality of bid fields for accepting bid information using a bid template from a second subset of said plurality of contractors, the second subset of plurality of contractors being a part of said first subset of plurality of contractors;

a plurality of bid information table fields for placing bid information for review by said outsourcing company;

a plurality of contractor evaluation field for storing an evaluation provided by the outsourcing company using a first evaluation template, wherein the evaluation template includes contractor performance, timing, budget, contract term, recommendation, comments and overall performance fields for access by all users; and a plurality of outsourcing company evaluation field for storing an evaluation provided by the contractor using a second evaluation template, wherein the second evaluation template includes performance, recommendation, timely payment, availability to aid and assist, importance of project, suggestions handling, compatibility, comments and overall performance fields for access by all users.

17. The data structure of said computer-readable memory of claim 16 wherein said plurality of outsourcing information fields further comprises a bid template.

18. The data structure of said computer-readable memory of claim 16 wherein said plurality of bid information table fields further comprises a bid information report.

19. The data structure of said computer-readable memory of claim 16 wherein said plurality of bid information table fields further comprises a bid information table.

20. The data structure of said computer-readable memory of claim 16 further comprising an address field for sending said outsourcing company an address location of said plurality of bid information table fields.

* * * * *